(12) United States Patent
Krumsiek et al.

(10) Patent No.: US 12,575,909 B2
(45) Date of Patent: Mar. 17, 2026

(54) ROOT CANAL INSTRUMENT

(71) Applicant: GEBR. BRASSELER GMBH & CO. KG, Lemgo (DE)

(72) Inventors: Michael Krumsiek, Lemgo (DE); Michael Küllmer, Lemgo (DE)

(73) Assignee: GEBR. BRASSELER GMBH & CO. KG, Lemgo (DE)

( * ) Notice: Subject to any disclaimer, the term of this patent is extended or adjusted under 35 U.S.C. 154(b) by 313 days.

(21) Appl. No.: 18/250,104

(22) PCT Filed: Sep. 22, 2021

(86) PCT No.: PCT/EP2021/076044
§ 371 (c)(1),
(2) Date: Apr. 21, 2023

(87) PCT Pub. No.: WO2022/089845
PCT Pub. Date: May 5, 2022

(65) Prior Publication Data
US 2023/0390024 A1 Dec. 7, 2023

(30) Foreign Application Priority Data
Oct. 30, 2020 (DE) ..................... 10 2020 128 671.6

(51) Int. Cl.
*C22C 30/02* (2006.01)
*A61C 5/42* (2017.01)
*C22F 1/00* (2006.01)
(52) U.S. Cl.
CPC ................ *A61C 5/42* (2017.02); *C22C 30/02* (2013.01); *C22F 1/002* (2013.01); *A61C 2201/007* (2013.01)

(58) Field of Classification Search
CPC ..... A61C 5/42; A61C 2201/007; C22C 30/02; C21D 9/0068
See application file for complete search history.

(56) References Cited

U.S. PATENT DOCUMENTS

| | | | |
|---|---|---|---|
| 4,565,589 A | 1/1986 | Harrison | |
| 5,044,947 A | 9/1991 | Sachbeva et al. | |
| (Continued) | | | |

FOREIGN PATENT DOCUMENTS

| | | |
|---|---|---|
| CN | 106119794 A | 11/2016 |
| DE | 202012012526 U1 | 3/2013 |
| (Continued) | | |

OTHER PUBLICATIONS

International Search Report and Written Opinion dated Dec. 20, 2021 frrom counterpart International Patent Application No. PCT/EP2021/076044.

(Continued)

*Primary Examiner* — Jessee R Roe
(74) *Attorney, Agent, or Firm* — SHUTTLEWORTH & INGERSOLL, PLC; Timothy J. Klima

(57) ABSTRACT

The invention relates to a root canal instrument having a shank and a working area attached to the shank, wherein the working area consists of a nickel-titanium alloy comprising 38 to 46 at % nickel, 46 to 53 at % titanium and 5.5 to 8.8 at % copper. The invention relates to a root canal instrument having a shank and a working area attached to the shank, wherein the working area consists of a nickel-titanium alloy comprising 38 to 46 at % nickel, 46 to 53 at % titanium and 5.5 to 8.8 at % copper.

20 Claims, 1 Drawing Sheet

(56)       References Cited

U.S. PATENT DOCUMENTS

| | | | |
|---|---|---|---|
| 5,683,245 | A | 11/1997 | Sachdeva et al. |
| 8,192,200 | B1 | 6/2012 | Heath et al. |
| 2004/0229188 | A1* | 11/2004 | Lewis .................... B23P 15/32 |
| | | | 433/102 |
| 2011/0271529 | A1 | 11/2011 | Yong et al. |
| 2018/0325624 | A1 | 11/2018 | Shotton et al. |

FOREIGN PATENT DOCUMENTS

| | | | | |
|---|---|---|---|---|
| EP | 1759656 | B1 | 7/2011 | |
| EP | 3574865 | B1 | 7/2021 | |
| WO | WO-9508296 | A1 * | 3/1995 | ....... A61B 17/06066 |

OTHER PUBLICATIONS

German Office Action dated Jul. 12, 2021 from counterpart German Patent Application No. 102020128671.6.
German Office Action dated Oct. 6, 2022 from counterpart German Patent Application No. 102020128671.6.
H. F. Li et al.: Design and development of novel antibacterial Ti—Ni—Cu shape memory alloys for biomedical application. Scientific reports 6.1 (2016): 1-11.

* cited by examiner

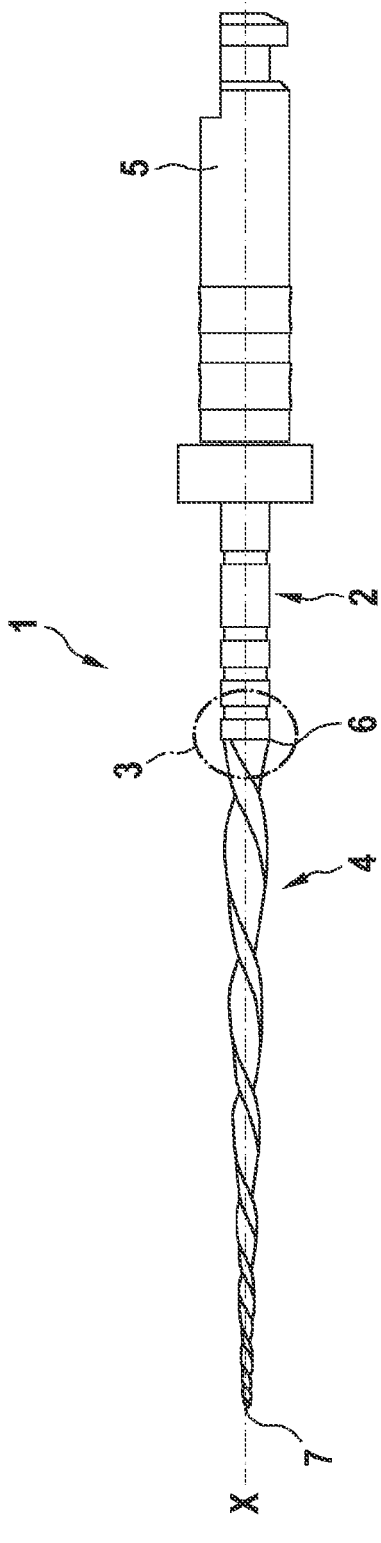

ROOT CANAL INSTRUMENT

This application is the National Phase of International Application PCT/EP2021/076044 filed Sep. 22, 2021 which designated the U.S.

This application claims priority to German Patent Application No. 102020128671.6 filed Oct. 30, 2020, which applications are incorporated by reference herein.

The present invention relates to a root canal instrument for treating a root canal of a tooth and a method for manufacturing the same. Furthermore, use of a nickel-titanium alloy for manufacturing a root canal instrument will also be described.

Root canal instruments are known from prior art, for example from DE 202012012526 U1. Root canal instruments are required to have some flexibility to follow the bends and turns of a root canal in order to perform appropriate root canal treatment. Starting from a working area of the root canal instrument, root canal instruments have a core, i.e. a solid core, which continuously widens conically towards a shank region of the root canal instrument. Molar teeth in particular have a relatively intricate root canal system in which the root canal instrument is required to also follow small radii of the root canal. For this purpose, the working area of the root canal instrument must be even more flexible. So far, this has been achieved by further tapering the core of the root canal instrument, which, however, results in lower mechanical stability of the working area and thus involves a certain risk of part of the working area breaking off during root canal treatment.

It is therefore the object of the present invention to provide a dental root canal instrument as well as a method for the manufacture thereof, which, while having simple and yet stable structure and being easy and inexpensive to manufacture, has improved flexibility and, in particular, is also able to follow up with strong curvature of a root canal of a tooth.

This object will be solved by providing a root canal instrument, a method for producing the same, as well as use thereof having the features of the independent claims. Preferred further developments of the invention will be shown in the subclaims.

The dental root canal instrument according to the invention having the features of claim 1 has the advantage that the root canal instrument is characterized by excellent flexibility. As a result, when treating a root canal, the bends and turns of the root canal can excellently be followed up with using the root canal instrument according to the invention, even in the case of molar root canals which are difficult to access, without any risk of the working area of the root canal instrument to break off. This means that dead or infected pulp tissue can completely be removed from the root canal with a high degree of certainty. This results in the greatest possible elimination of microorganisms present in the root canal.

According to the invention, this will be achieved by providing the root canal instrument comprising a shank and a working area attached to the shank, the working area consisting of a nickel-titanium alloy comprising 38 to 46 at % nickel, 46 to 53 at % titanium and 5.5 to 8.8 at % copper. The geometry of the root canal instrument according to the invention can be designed in the conventional manner, i.e. in particular tapered from a first end of the working area, which is connected to the shank, to a second, exposed end of the working area. In this case, the working area serves as a cutting area for the root canal and in particular comprises a plurality of cutting edges arranged along a core. By using a nickel-titanium alloy as defined above, the working area is formed from a highly flexible material which nevertheless is characterized by having high mechanical stability, i.e. in particular high tensile stress of at least 800 MPa, as well as a high flexibility or large Young's modulus combined with good elongation capacity, which effectively can prevent break-off to occur when using the root canal instrument. Due to its physical and mechanical properties, the copper-containing nickel-titanium alloy is ideally suited for forming a highly flexible working area for a root canal instrument.

To improve fatigue strength, the nickel-titanium alloy may preferably further comprise 0.05 to 0.15 at % chromium.

According to a most preferable further development, the nickel-titanium alloy essentially comprises 40.5 to 43.1 at % nickel, 48.7 to 50.8 at % titanium, 6.3 to 8.4 at % copper, and 0.08 to 0.13 at % chromium, and more particularly 42.50 at % nickel, 49.90 at % titanium, 7.50 at % copper, and 0.10 at % chromium. Herein, "essentially" means that no other alloying metals or additives are actively added, but any small amounts of metals or additives may be present in the form of impurities in the materials used.

To further stabilize the alloy structure, the nickel-titanium alloy comprises a maximum of 500 ppm oxygen and nitrogen and/or a maximum of 500 ppm carbon and/or a maximum of 50 ppm hydrogen, according to ASTM F 2063-15. In particular, the total oxygen and nitrogen content is below 500 ppm, the carbon content is below 500 ppm, and the hydrogen content is below 50 ppm.

To improve bending property of the working area, the nickel-titanium alloy is annealed within a temperature range of 350° C. to 450° C. This means that the nickel-titanium alloy forming the working area was heat-treated for a period of about 5 min to 4 h within a temperature range of 350° C. to 450° C., which optimized the lattice structure of the alloy lattice.

Temperature treatment by induction for 1 second to 60 seconds at a temperature of 500° C.+−20° C. has also been prfurnace to be advantageous. This may also improve the lattice structure of the alloy lattice.

Further advantageously, the nickel-titanium alloy was work-hardened to 21 to 40% and in particular to 35% prior to mechanical machining (i.e. prior to machining to form the working area, for example).

In order to improve not only the bending capability but also the mechanical stability with regard to any stretchability, which in particular counteracts break-off of the working area under high torsional forces, the nickel-titanium alloy was quenched to room temperature following heat treatment or annealing. For the purposes of the present invention, quenching is understood to mean quenching from the annealing temperature or the temperature of the heat treatment to room temperature, i.e. to about 20 to 25° C. This will essentially be achieved by bringing the annealed or heat-treated nickel-titanium alloy into contact with a medium kept at room temperature. The medium essentially is not limited and may include gases, such as nitrogen or carbon dioxide, or liquids, such as water and other inert solvents.

Particularly advantageously, the quenching is performed in water. It has been found that water, due to its high heat capacity, results in particularly rapid cooling of the nickel-titanium alloy, further improving both flexibility and stretchability of the working area.

Further advantageously, the root canal instrument, in the axial direction, comprises regions having different angles of twist and which are each made of the nickel-titanium alloy. Due to the regions having different geometries, a working area can be formed which is characterized by a shape which in particular greatly tapers in the direction of the second, exposed end, but which, due to the use of the nickel-titanium alloy, is characterized by sufficiently high mechanical stability and flexibility without being subject to risk of break-off.

Furthermore, according to the invention, a method for producing a root canal instrument as disclosed above will also be described. In other words, the method according to the invention is used to manufacture the root canal instrument according to the invention. In this regard, the method first comprises a step of providing a nickel-titanium alloy in the form of a strand, the nickel-titanium alloy comprising 38 to 46 at % nickel, 46 to 53 at % titanium, and 5.5 to 8.8 at % copper. In a subsequent process step, the strand is machined to form a working area. Machining may include any machining process suitable for nickel alloys, and in particular mechanical machining. Following completion of the working area, it is attached to a shank. The shank essentially is not restricted and may also be made of any metallic or plastic materials for example.

The advantages, beneficial effects and further developments described for the root canal instrument according to the invention also apply to the method for manufacturing the root canal instrument according to the invention. Furthermore, with regard to any definitions, additional reference is made to the foregoing explanations.

Advantageously, regarding flexibility improvement of the working area, the nickel-titanium alloy is annealed within a temperature range of 350 to 450° C. As explained above, for annealing, the nickel-titanium alloy forming the working area is heat-treated for a period of about 5 min to 4 h in a temperature range of 350° C. to 450° C., which allows the lattice structure of the alloy lattice to be optimized. Advantageously, annealing is performed in a furnace under an oxygen atmosphere. However, a variant may also comprise annealing in a vacuum and/or in an argon atmosphere.

According to an alternative heat treatment, the nickel-titanium alloy is heat treated by induction for 1 second to 60 seconds at a temperature of 500° C.±20° C., which also leads to improvement of the lattice structure of the alloy lattice, but is much more time-saving. Another advantageous further development of induction heating is to locally restrict the heat zone.

Further advantageously, the nickel-titanium alloy can be work-hardened to 21 to 40%, especially 35%, prior to machining the strand. When the material is work-hardened, the temperature range for heat treatment may shift. In this case, 30% work hardening results in a higher temperature by about 100° C. for the heat treatment.

Further advantageously, the nickel-titanium alloy is quenched following annealing, which is carried out in particular using water kept at room temperature. In particular, the machined nickel-titanium alloy is brought into contact with a medium, such as in particular water, kept at about 20 to 25° C. immediately following heat treatment or tempering, i.e., for example, after removal from the furnace, where quenching of the nickel-titanium alloy is performed, as a result of which the lattice structure is changed such that, in addition to the bending capability, the mechanical stability, with respect to any stretchability of the working area, is also improved.

Preferably, the working area will be attached to the shank by pressing, welding or gating. In particular, the first two methods mentioned are especially suitable when the shank is formed from a metallic material. Direct gating of the shank to the working area, i.e. to the first end of the working area, is performed in particular if the shank is made of an injection-moldable plastic material, wherein, for example, an injection molding technique will be used.

Furthermore, according to the invention, the use of a nickel-titanium alloy will also be described, which essentially consists of 38 to 46 at % nickel, 46 to 53 at % titanium, to 8.8 at % copper and 0.05 to 0.15 at % chromium, the proportion of chromium is in particular 0.08 to 0.13 at % and furthermore in particular 0.01 at %. The use of the nickel-titanium alloy is intended for the manufacture of a root canal instrument, the root canal instrument being characterized by a particularly flexible and bendable working area. The embodiments and advantageous further developments of the root canal instrument according to the invention also apply to the use according to the invention.

In the following, the invention will be described by means of an example embodiment while reference will be made to the drawing, wherein:

FIG. 1 is a schematic lateral view of a root canal instrument according to one embodiment of the invention.

FIG. 1 shows a detailed view of a root canal instrument 1 with a shank 2 and a working area 4 connected to the shank 2 by a coupling region 3. A fitting 5 is located at a distal end of the shank 2. The fitting 5 is used to be connected to a drive or a handpiece which is used by a dentist to operate the root canal instrument 1.

The working area 4 is to be regarded as a cutting area used to remove dead or bacterially infected pulp tissue of a root canal. The working area 4 has a first end 6 and a second end 7. The first end 6 is connected to the shank 2 in the coupling region 3, while the second end 7 is exposed and has a tip. Overall, the extent of the working area 2 from the first end 6 to the second end 7 is more or less conical, with the working area 2 comprising a plurality of regions in the axial direction X-X that are provided with different angles of twist, with the angles of twist decreasing from the first end 6 to the second end 7.

The working area 4 is made of a nickel-titanium alloy comprising 38 to 46 at % nickel, 46 to 53 at % titanium, and 5.5 to 8.8 at % copper. Furthermore, the nickel-titanium alloy may comprise 0.05 to 0.15 at % chromium, a maximum of 500 ppm oxygen and nitrogen, a maximum of 500 ppm carbon, and a maximum of 50 ppm hydrogen. Due to the use of the nickel-titanium alloy, the working area 4 is characterized by particularly good bending properties and high stretchability. This enables the working area to penetrate even into those root canals which are difficult to access, to remove tissue residues therefrom and to form a conical root canal. Due to high flexibility and stretchability of the working area 4, a diameter of the working area 4 can be made very small, since the working area 4 is still characterized by high mechanical stability due to the use of the nickel-titanium alloy, such that break-off of the working area does not occur.

Preferably, the nickel-titanium alloy is annealed within a temperature range of 350 to 450° C. and quenched with water to room temperature (about 20 to 25° C.), which can improve stretchability and flexibility while maintaining high fracture strength.

EXAMPLES

Working areas for a root canal instrument were manufactured from the alloys indicated in Table 1, which can be designed as shown in FIG. 1.

For this purpose, material strands were produced from the indicated alloys, which were first stored at room temperature (20 to 25° C.). The material was not work-hardened. Subsequently, the material strands were stored in a furnace at 350 to 450° C. for a period of 30 minutes (the period may in particular be in the range of 5 to 60 minutes and preferably in the range of 20 to 40 minutes). Furnace heating was carried out without passing a temperature ramp. Subsequently, the heat-treated working areas were quenched in water which was maintained at room temperature. From the alloy material obtained, working areas for a root canal instrument were fabricated by machining. In Table 1, the physical and mechanical properties of the alloys used will additionally be indicated.

TABLE 1

|  | Example 1 | Comparative example |
| --- | --- | --- |
| Nickel | 42.50 At % | 50.10 At % |
| Titanium | 49.90 At % | 49.90 At % |
| Copper | 7.50 At % | — |
| Chromium | 0.10 At % | — |
| Oxygen and nitrogen | Max. 500 ppm | 220 ppm |
| Carbon | Max. 500 ppm | 320 ppm |
| Hydrogen | Max. 50 ppm | 50 ppm |
| Elongation | Min. 30% | 10% |
| Tensile stress | Min. 800 MPa | 1100 MPa |
| Melting point | 1310° C. | — |
| E-modulus (austenite) | 25-35 GPa (60-80 GPa) | — |

The strength and elongation were determined according to ASTM F 2516 edition 2018. The following formula was used to determine the max. tensile stress ($\sigma z$):

$$\sigma z = F/S \ (F=\text{force in MPa}, S=\text{cross-sectional area in } mm^2).$$

The force (F) was determined on a tensile and compression testing machine using the following parameters:

Crosshead speed=1 mm/min.

Reference diameter (material)=1.0 mm and 1.2 mm.

The modulus of elasticity was determined based on the tensile test as the slope up to the yield point of the material (onset of plastic deformation according to Hook's straight line).

As may be seen from Table 1, the alloy of Example 1 is characterized by having particularly high elongation and tensile stress, resulting in high stretchability and flexibility. Thus, a working area for a root canal instrument formed from the alloy of Example 1 is also characterized by particularly high flexibility.

LIST OF REFERENCE NUMBERS

1 Root canal instrument
2 Shank
3 Coupling region
4 Fitting
6 First end
7 Second end

The invention claimed is:

1. A root canal instrument comprising a shank and a working area attached to the shank, wherein the working area is made of a nickel-titanium alloy comprising 40.5 to 43.1 at % nickel, 48.7 to 50.8 at % titanium, 6.3 to 8.4 at % copper, and 0.08 to 0.13 at % chromium.

2. The root canal instrument according to claim 1, wherein the nickel-titanium alloy consisting essentially of 42.50 at % nickel, 49.90 at % titanium, 7.50 at % copper, and 0.10 at % chromium.

3. The root canal instrument according to claim 1, wherein the nickel-titanium alloy is annealed within a temperature range of 350 to 450° C. or wherein the nickel-titanium alloy has been heat-treated by induction for 1 second to 60 seconds at a temperature of 500° C.+−20° C.

4. The root canal instrument according to claim 3, wherein the nickel-titanium alloy was heat treated or tempered and subsequently quenched to room temperature.

5. The root canal instrument according to claim 4, wherein the nickel-titanium alloy was quenched in water.

6. The root canal instrument according to claim 1, wherein the nickel-titanium alloy comprises a maximum of 50 ppm hydrogen according to ASTM F 2063-15.

7. The root canal instrument according to claim 1, wherein the nickel-titanium alloy comprises a maximum of 500 ppm carbon.

8. The root canal instrument according to claim 7, wherein the nickel-titanium alloy comprises a maximum of 50 ppm hydrogen according to ASTM F 2063-15.

9. The root canal instrument according to claim 1, wherein the nickel-titanium alloy comprises a maximum of 500 ppm oxygen and nitrogen.

10. The root canal instrument according to claim 9, wherein the nickel-titanium alloy comprises a maximum of 50 ppm hydrogen according to ASTM F 2063-15.

11. The root canal instrument according to claim 9, wherein the nickel-titanium alloy comprises a maximum of 500 ppm carbon.

12. The root canal instrument according to claim 11, wherein the nickel-titanium alloy comprises a maximum of 50 ppm hydrogen according to ASTM F 2063-15.

13. The root canal instrument according to claim 1, wherein the nickel-titanium alloy has been work-hardened by 21 to 40%.

14. The root canal instrument according to claim 13, wherein the nickel-titanium alloy has been work-hardened by 35%.

15. A method for manufacturing a root canal instrument according to claim 1, comprising the steps of:

providing a root canal instrument comprising a shank and a working area attached to the shank, providing the working area with a nickel-titanium alloy comprising 40.5 to 43.1 at % nickel, 48.7 to 50.8 at % titanium, 6.3 to 8.4 at % copper and 0.08 to 0.13 at % chromium in the form of a strand, machining the strand to form the working area, and connecting the working area to a shank, wherein connection of the working area to the shank is in particular effected by pressing, welding or gating.

16. The method according to claim 15, and further comprising a step of annealing the nickel-titanium alloy within a temperature range of 350 to 450° C. or comprising a step of heat treating the nickel-titanium alloy by induction for 1 second to 60 seconds at a temperature of 500° C.+−20° C.

17. The method according to claim 16, and further comprising a step of quenching the heat-treated or annealed nickel-titanium alloy to room temperature.

18. The method according to claim 17, wherein the nickel-titanium alloy is quenched in water.

19. The method according to claim 15, wherein the nickel-titanium alloy is work-hardened to 21 to 40%.

20. The method according to claim 19, wherein the nickel-titanium alloy is work-hardened by 35%.

* * * * *